United States Patent [19]
Brisk et al.

[11] 3,778,768
[45] Dec. 11, 1973

[54] CHARACTER DETECTION SYSTEM

[75] Inventors: Richard A. Brisk, Somerville; Guy L. Fougere, Lincoln; Lawrence D. Lorah, Concord; Harvey L. Pastan, Chestnut Hill, all of Mass.

[73] Assignee: Arthur D. Little Inc., Cambridge, Mass.

[22] Filed: Aug. 27, 1971

[21] Appl. No.: 175,656

[52] U.S. Cl. .......... 340/146.3 AG
[51] Int. Cl. .......... G06k 9/12
[58] Field of Search .......... 340/146.3 AG, 146.3 MA

[56] References Cited

UNITED STATES PATENTS

| | | | |
|---|---|---|---|
| 3,159,815 | 12/1964 | Groce | 340/146.3 AG |
| 3,675,201 | 7/1972 | McKissick et al. | 340/146.3 AG |
| 3,568,151 | 3/1971 | Majima | 340/146.3 AG |
| 3,496,541 | 2/1970 | Haxby et al. | 340/146.3 AG |
| 3,506,837 | 4/1970 | Majima | 340/146.3 MA |
| 3,290,651 | 12/1966 | Paufve et al. | 340/146.3 MA |

*Primary Examiner*—Maynard R. Wilbur
*Assistant Examiner*—Leo H. Boudreau
*Attorney*—Joseph Weingarten, Russell L. Root and Ray S. Pyle

[57] ABSTRACT

An optical character detection system in which a plurality of digital signals are adaptively produced based upon actual characteristics of a character and its background being viewed and reliably representing the presence or absence of a scanned character. An elongated array of photosensors is disposed along a linear axis orthogonal to the path of character travel and arranged for relative motion with characters to be read. The array includes sensors which view the document background above and below the character field to provide a reference signal for comparison with the signals of the character sensors to produce the digital signals representing a character.

6 Claims, 6 Drawing Figures

CHARACTER DETECTION SYSTEM

FIELD OF THE INVENTION

This invention relates to optical character recognition systems and more particularly to a character detection system having an adaptive threshold for the reliable detection of character data and the provision of digital signals representing such character data.

BACKGROUND OF THE INVENTION

In optical character recognition systems, characters such as numerals, letters and symbols printed on a record-bearing surface are scanned to provide signals representing the identity of a scanned character, these signals being processed by recognition logic to ascertain the identity of the character scanned. To enchance the reliability of the recognition process, it is desirable to initially assure that a true character is being seen and to distinguish scanned portions of the character from the background on which the character resides. In the description which follows, it is assumed that black or relatively dark characters are printed on a white or relatively light background. The converse situation is however also contemplated by the invention. In the absence of a character, light reflected from the character-bearing surface received by a photosensitive detector produces a signal level, hereinafter termed the white level, which is representative of the background of a character field. During scanning of a character, light reflected from portions of the character received by the detector produces a second signal level, hereinafter termed the black level, representative of character presence.

It will be appreciated, however, that both the black level and white level can vary over a considerable range of reflectivity complicating the charcter detection operation. The white level can vary with different reflectivities of the record-bearing surface, which can differ not only from surface to surface such as on respective cards or sheets, but also within the same surface due to nonuniformity of surface characteristics. Surface reflectivity can also vary by reason of dirt or other contamination on areas of the surface. Variations in the black level can occur due to variations in the quality of the marking material forming the characters being read.

In general, character detection has been accomplished using fixed thresholds determined in accordance with specified reflectance characteristics presumed for characters to be read and for their background surface. Reliable detection using this approach requires a rather rigid specification of useable character and sheet qualities, which can increase the cost of machine readable documents and which also limits the versatility of the reading system. Detection techniques have been proposed using variable thresholds which are varied in accordance with information derived from previous scans of a sheet or character being read. According to such latter techniques, a character can be scanned initially to determine threhold levels and then scanned again for reading; or, an average level determination can be made based upon earlier scanning of preceding characters. Multiple scanning of a character requires additional time and decision circuitry, while level averaging often requires complex logic circuitry.

SUMMARY OF THE INVENTION

In accordance with the present invention, an optical character detection system is provided in which a photosensor array generates signals representing both character and background information which are processed to produce a plurality of digital signals based upon actual characteristics of a character being scanned and of the immediate background of the surface on which the character is formed to reliably represent the presence or absence of a scanned character. Character detection is thus achieved in a manner adaptive to true operating conditions at the time of character scanning. Briefly, the invention comprises an elongated array of photosensors arranged along a linear axis disposed substantially orthogonally with respect to the axis of travel of characters being scanned. The array has an active length greater than the height of characters to be read and is aligned with respect to the character field such that one or more sensors of the array both above and below the character field always view portions of the character-bearing surface immediately adjacent the character field.

The array is disposed for relative movement with respect to the character-bearing surface and provides a plurality of output signals representing respective portions of a surface being scanned. The signals provided by the background-viewing sensors of the elongated array are employed to produce a reference threshold against which the signals from the character-viewing sensors are compared to provide digital output signals representative of character (black) and background (white) portions of the surface being viewed. The variable white level signal provided by the background-viewing sensors is representative of the actual reflectance characteristics of the surface being scanned in the immediate vicinity of the character-bearing field. Thus, a threshold decision is based upon actual characteristics rather than on information assumed for a particular operating environment, as in conventional systems.

Typically, the sensor array is in a stationary position with the character-bearing surface arranged for movement past the array in a direction substantially orthogonal thereto at a uniform rate by means of a suitable transport mechanism. The character-bearing medium, usually in the form of a card or sheet, has a predetermined character field area defined thereon along the axis of movement, and is such that the character-viewing sensors of the array are in alignment with the predetermined character field, while the background-viewing sensors are in alignment with noncharacter-bearing background portions along the axis of travel of the record medium immediately above and below the character field.

For convenience of discussion herein, the longitudinal axis of the elongated array will be referred to as the vertical axis, while the orthogonal axis of record travel will be termed the horizontal axis. Upon movement of a document and a character thereon along the horizontal axis past the photosensor array, the digital signals are processed to determine the presence of a character by detection of the first and subsequent strokes thereof to generate a matrix of information representing character identity. The matrix of data is then processed by recognition logic to ascertain the identity of the scanned character.

DESCRIPTION OF THE DRAWINGS

The invention will be more fully understood from the following detailed description taken in conjunction with the accompanying drawings, in which.

DETAILED DESCRIPTION OF THE INVENTION

The present invention will be described in the context of a system for reading both large and small character fonts. Small fonts readable according to the invention are typically the ANSII I (also known as OCR A–I) and Farrington 12–F, while typical large character fonts are the ANSII IV (also known as OCR A–IV) and Farrington 7–B. Different font sizes are accommodated by use of variable magnification optics operative to image the different fonts onto a common sensor array.

Figure 1:
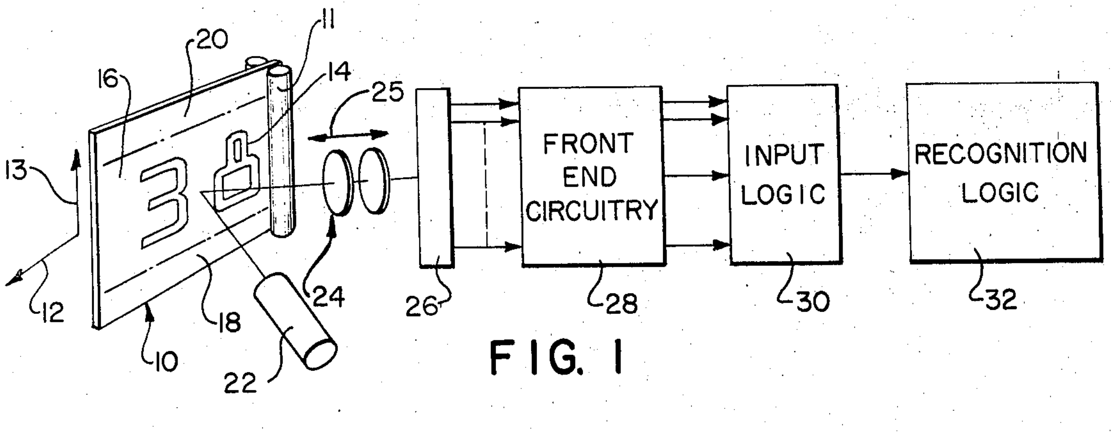
FIG. 1 is a schematic representation of a character detection system according to the invention.

Referring to FIG. 1 there is shown a document 10 disposed for linear movement at a uniform rate along an axis 12, and bearing characters 14 imprinted or otherwise formed on a surface thereof for machine reading. The characters 14 are disposed within a character field 16 (delineated by dashed lines in the drawing but not in actual existence) along a travel axis 12 of document 10, with a non-character bearing band 18 and 20 provided along the document immediately below and above the character field 16, respectively. Document travel is in the direction of axis 12, while characters are read along an axis 13 substantially orthogonal to axis 12 and parallel to the vertical strokes of characters 14. The characters occupy less than the full height of field 16 to provide for vertical registration tolerance. The circuitry for framing and viewing a character is greatly simplified by the disposition of the document and characters thereon in predetermined orientation with respect to the character sensors. The document 10 is moved by an associated transport, depicted as including drive rollers 11, and which can be of any well known construction, at a predetermined and uniform rate of travel. Clock pulses for subsequent logic processing are generated in relation to the rate of travel and are synchronized with document travel to assure precise and related timing.

A light source 22 is angularly disposed with respect to the plane of document 10 and is arranged to direct a light beam onto characters 14 and also onto at least a predetermined portion of bands 18 and 20 adjacent the character field to illuminate the vertical extent of field 16 and associated bands 18 and 20. Light reflected from the document is imaged by a lens system 24 onto a linear array of photosensors 26 which has an active length sufficient for viewing the entire vertical extent of character field 16 and predetermined portions of bands 18 and 20.

The light source 22 is operative to provide uniform illumination over an area of a height equal to the height of field 16 and adjacent portions of bands 18 and 20 viewed by array 26, and of a width substantially equal to the width of the sensor array. Typically, the light source includes a lamp such as a 100 watt 2,800°K quartz halogen lamp, having an elongated filament arranged parallel to axis 13 and disposed with respect to a spherical mirror for reimaging the lamp filament, and a condensing lens to provide a collimated light beam for document illumination. The reading axis is orthogonal to the plane of document 10 to minimize specular reflection of light from the document surface. The lens system 24 is operative to magnify the image of characters 14 onto the sensor array 26, and can be of the variable magnification type to provide variable degrees of magnification to accommodate different font sizes to be read. For example, the lens system can be of the zoom type movable along an axis toward or away from document 10, as illustrated by arrows 25, to provide the intended degree of magnification for a particular font size. For reading the large and small fonts identified above, magnifications of 2.6 and 3.5 are respectively employed in a typical implementation.

The photosensor array responds to reflectivity from document 10 and characters 14 thereon and provides a plurality of signals representative of the characters being viewed and the document background in the vicinity of the viewed characters. The signals from array 26 are applied to front-end circuitry 28 operative to provide a plurality of digital output signals representative of black and white areas of a document surface sensed by the array and determinative of the presence of a character thereon. A plurality of signals from a portion of array 26 viewing character field 16 represents character data, while the portions of array 26 viewing non-character containing bands 18 and 20 provide signals representing the background characteristics of the surface on which the characters are printed.

The background signals are combined to produce an adaptive threshold directly responsive to the varying reflectivity of the document surface of bands 18 and 20, and which thus defines a white level against which the character signals are compared to yield an electronic decision of whether or not a black character portion is seen by array 26. The digital output signals from front-end circuitry 28 are applied to input logic 30 operative to assemble or frame a character being read and to apply character data to recognition logic 32 for identification of the framed character.

The input logic 30 is operative to identify the presence of a document and a character thereon and to define the frame of the character for subsequent recognition. Each character is read by a succession of vertical scans (along axis 13) to develop a matrix of information representative of the character. Each elemental cell of the matrix contains information of one value, referred to as black information, if a corresponding portion of the document surface contains part of a character viewed by the array 26, and contains information of opposite value, referred to as white information, if the corresponding portion of the document surface contains no character data.

Figures 2, 3, 5:
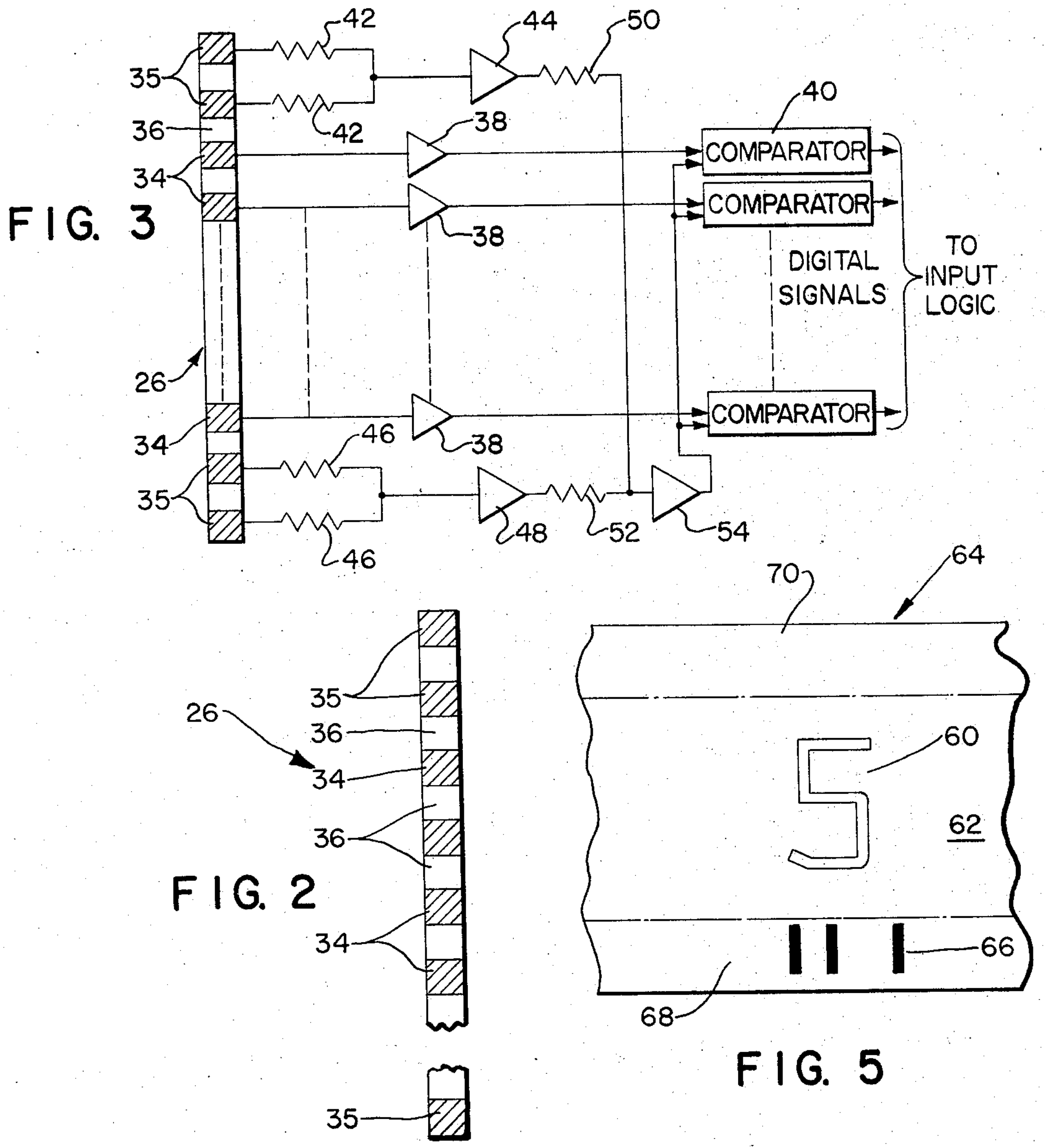
FIG. 2 is a schematic representation of an elongated photosensor array useful in the invention.
FIG. 3 is a schematic representation of the front-end circuitry of FIG. 1 embodying the invention.
FIG. 5 is a diagrammatic view of a character-bearing document readable by use of the circuitry of FIG. 4.

The photosensor array 26 is illustrated more fully in FIG. 2 and includes a plurality of photosensors 34 linearly arrayed and separated one from the other by spaced areas 36. The height and width of each sensor and the gap therebetween are determined to provide an intended resolution for the characters being read. The width of the sensor, that is the dimension along axis 12, should be small in comparison to the width of the vertical stroke of a character being viewed to prevent deformation of the stroke, and, in practice, the particular dimensions of the sensors are selected to yield acceptable signal fidelity with sufficient signal strength for subsequent processing. A predetermined number of sensors 35 disposed on each end of array 26 are arranged to view respective bands 18 and 20 on document 10 and serve as background sensors, hwile a predetermined number of sensors 34 centrally of the array view character field 16 and serve as character sensors. In the illustrated embodiment, 42 sensors are provided on array 26, with 38 sensors viewing field 16 and two sensors at each end serving as the background sensors. Typically, a character 14 occupies about half the height of field 16, and therefore a character is viewed by approximately half the sensors 34. So long as characters are within the field 16, they can be readily detected by array 26 and a considerable latitude of vertical position is thus easily accommodated by the present invention.

The output signals of the background sensors 35 are combined to provide a threshold level which is directly responsive to the actual reflectance characteristics of the document surface adjacent the character field to provide an adaptive threshold level for accurate signal processing. The background reflectivity measurement is made over a sufficient area to average out local variations in surface reflectivity which can be as great as 10 percent. In the present embodiment, the background is sensed from an area about four times that of any one sensor and with a time constant equal to approximately the scanning time of one stroke width. The sensor typically is of the photovoltaic type and is formed by semiconductor device techniques as an integrated array of cells in a common silicon substrate. The formation of the sensor array on a common substrate is preferable since such a technique permits the easy production of a precise array and associated interconnections in a unitary structure which can be readily installed and aligned for system use. Moreover, all sensor cells formed on a common substrate undergo substantially the same thermal variation such that the sensitivity of the array is uniformly affected by temperature variations. Photovoltaic sensors are especially useful since a stable dark current output is provided which is not materially sensitive to temperature variations.

The front-end circuitry 28 receiving signals from the sensor array 26 is illustrated in FIG. 3. Each character sensor 34 viewing the character field 16 is connected to a respective amplifier 38, the output of which is coupled to an input of a respective comparator 40. The background sensors 35 at the extremities of the array viewing the respective bands 18 and 20 are summed together to provide a reference signal for each of the comparators 40. More specifically, the output of upper sensors 35 are connected via respective resistors 42 to an amplifier 44. Similarly, the lower sensors 35 are coupled via respective resistors 46 to an amplifier 48. The output signals of amplifiers 44 and 48 are each coupled via respective resistors 50 and 52 to an amplifier 54, the output of which provides the reference signal to comparators 40. The background sensors 35 view only the document surface on which characters are printed and thus provide output signals indicative of the background reflectance of the document surface in the region of the viewed characters. The summed version of the background sensors is representative of the average reflectance viewed by the sensors and from which a variable threshold level is derived in comparators 40 for controlling in an adaptive manner the black-white decision.

The threshold level of comparators 40 is selected to optimize the black-white decision for documents of predetermined reflectance characteristics. The threshold is at a level intermediate the white background level and the black character level, and typically is of the order of 50 percent of the white level. When the output signals of the character sensors 34 are less than or equal to the comparator threshold level derived from the background sensors 35, indicating the presence of a character, a black level output signal is provided by the respective comparators 40 associated with those sensors viewing portions of a character. When, however, the character sensors 34 produce an output signal greater than the threshold level, a white level output signal is provided by comparators 40 indicating that no character is being viewed by the associated sensors. Thus, digital signals are developed which are an accurate representation of a character being viewed and which character can reside on a surface of varying reflectivity.

The reference signal circuitry is shown more particularly in FIG. 4 and is operative in one mode of operation to view the background bands 18 and 20 both above and below the character field to provide an output indication of document surface reflectance of these regions. The circuitry is also operative in another mode to accommodate a bar code or other printed matter which is known to be located immediately above or below the character field being scanned. Such a bar code is illustrated in FIG. 5 wherein a character 60 is shown within a character field 62 of a document 64. A bar code 66 representative of the character 60 immediately thereabove is disposed within band 68 along the lower portion of document 64. The band 70 along the upper portion of document 64 is free of any marking. The reference circuitry is operative to accommodate a bar code in either the upper or lower background band and to ignore the presence of such a code in providing a background reference level for adaptive threshold determination.

Figure 4:
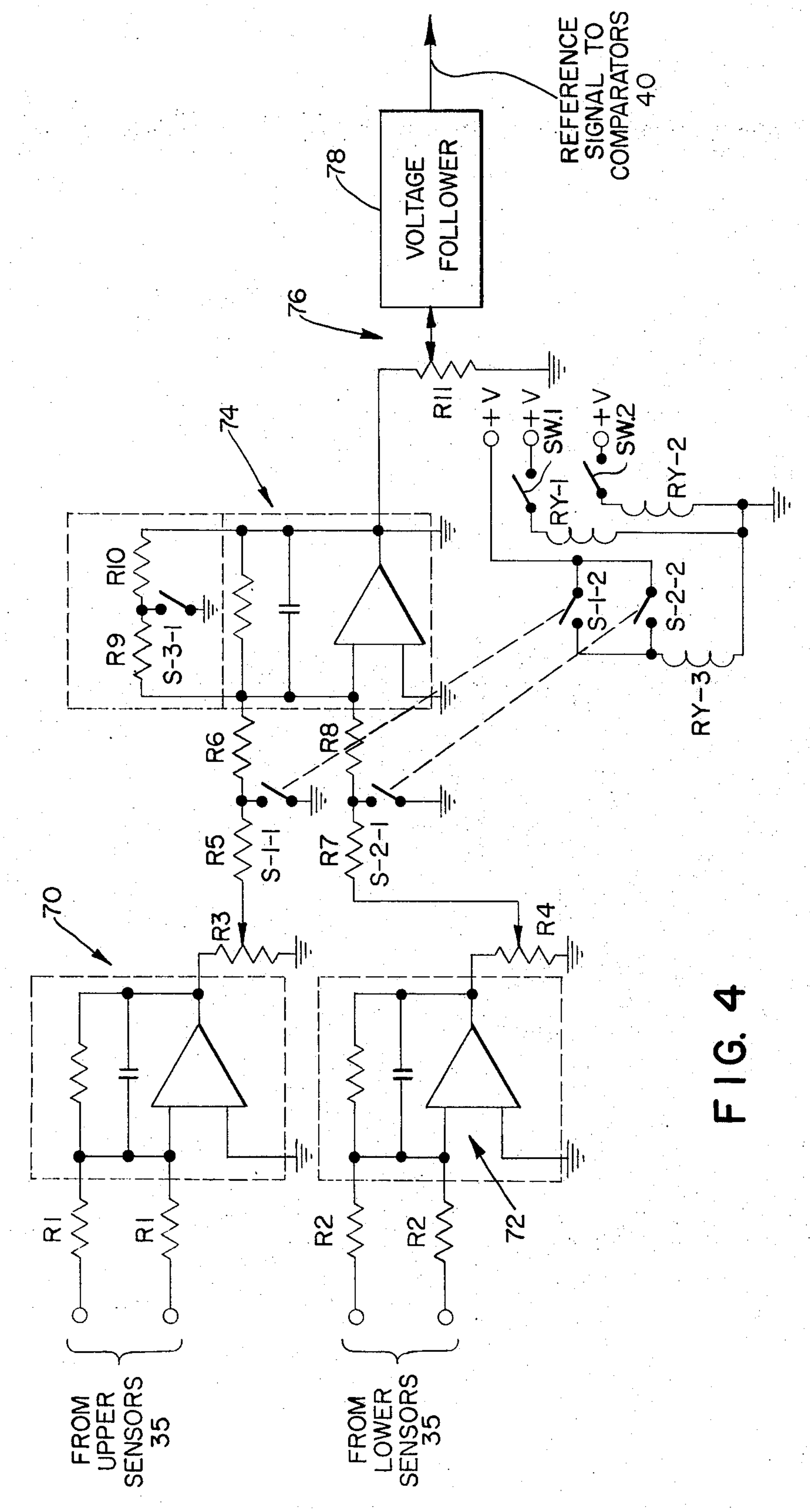
FIG. 4 is a schematic representation of the reference circuitry useful in the front-end circuitry of FIG. 3.

Referring to FIG. 4, the output signals from the upper two sensors 35 are averaged by means of respective resistors R1 into the negative input of a feedback amplifier 70, the positive input of amplifier 70 being connected to a source of ground potential. Similarly, the output signals of the lower sensors 35 are averaged by respective resistors R2 and applied to the negative input of feedback amplifier 72, the positive input thereof being grounded. Output signals from amplifiers 70 and 72 are developed across respective potentiometers R3 and R4 and are representative of the averaged reference signals from the upper and lower portions of the array, respectively, resulting from background bands 20 and 18. Potentiometers R3 and R4 are adjustable to provide an output signal having a common scale factor as the other signals from the character sensors 34.

The signals derived from potentiometer R3 are applied via series connected resistors R5 and R6 to the negative input of feedback amplifier 74, while the signals from potentiometer R4 are applied to the negative input of amplifier 74 by way of series connected resistors R7 and R8. The positive input of amplifier 74 is grounded as before. A switch S–1–1 is connected between the junction of resistors R5 and R6 and ground potential and is ganged to a switch S–1–2 associated with a relay RY1. A switch S–2–1 is connected between the junction of resistors R7 and R8 and ground potential is mechanically linked to switch S–2–2 associated with relay RY2. A third relay RY3 is wired as shown, the associated switch S–3–1 being connected between the junction of feedback resistors R9 and R10 and ground potential. All switches are normally open, as shown, and a source of potential +V is applied to one terminal of normally open switches S–1–2 and S–2–2, while an energizing voltage +V is also appliable to relay coils RY1 and RY2 via respective manually actuable switches SW1 and SW2.

In the case where no bar code is present in the bands above and below the character field, the circuit is operative to average the reflectance from the regions both above and below the character field to provide an adaptive threshold level. Where a bar code is disposed in a region below the character field, as depicted in FIG. 5 for example, the reference circuit is operative to average the document background reflectance from the band 70 above the character field. On the other hand, where a bar code is located above the character field, the reference circuit is operative to average the background reflectance from the region 68 below the character field. When the bar code is located above the character field, switch SW1 is closed causing actuation of relay RY1, causing closure of associated contacts S–1–1 and S–1–2. Closure of switch S–1–1 effectively shorts out the upper channels viewing the document area containing the bar code to be ignored in reference determination; thus, the output reference level is a function of the average reflectance measured from the non-bar code containing region 68 below the character field. The switch closure of switch S–1–2 permits actuation of relay RY3 to cause closure of associated contact S–3–1 in order not to reduce the output scale factor to half its former value. Closure of switch S–3–1 effectively increases the feedback resistance of the output amplifier 74 by a factor of two thereby doubling the gain of this amplifier stage and maintaining the overall threshold voltage at its former level.

Circuit operation for the presence of a bar code in a region below the character field is accomplished in similar manner by actuation of switch SW2, causing energization of relay RY2 which, in turn, shorts out the lower channels and adjusts the output scale factor to provide a reference voltage ouput representative of the average document reflectance from the region above the character field.

In certain situations, for example, in the presence of low white inputs to the photosensor array such as encountered when no document is present in the field of view, the reference circuitry can tend toward instability since the comparators will attempt to compare small residual voltages and noise in order to attempt a black-white decision. In the absence of a document, the comparators should preferably be inhibited to prevent such instability, and this can be accomplished by limiting the threshold voltage at a level above zero and at a level selected to be above any DC amplifier offset voltages and noise which may exist. Such level adjustment is accomplished by output stage 76. The voltage output from amplifier 74 is applied to a potentiometer R11, the output of which is coupled to a unity gain voltage follower 78 which includes means such as a precision diode for clamping the output voltage to a lower level of predetermined value, say 0.1 volts. The potentiometer R11 is employed to adjust the threshold level to a value between the white and black levels to enhance the black-white decision for documents of predetermined quality.

Since the threshold level is above the signal level of the character viewing sensors, which in the absence of a document is essentially zero, the comparators 40 produce a black level output in the absence of a document. In the presence of a document, the signal level of reference sensors 35 will be above the clamped level, allowing the comparators 40 to switch to a white level condition, and the presence of a white level signal from all comparators can signal document presence.

Figure 6:
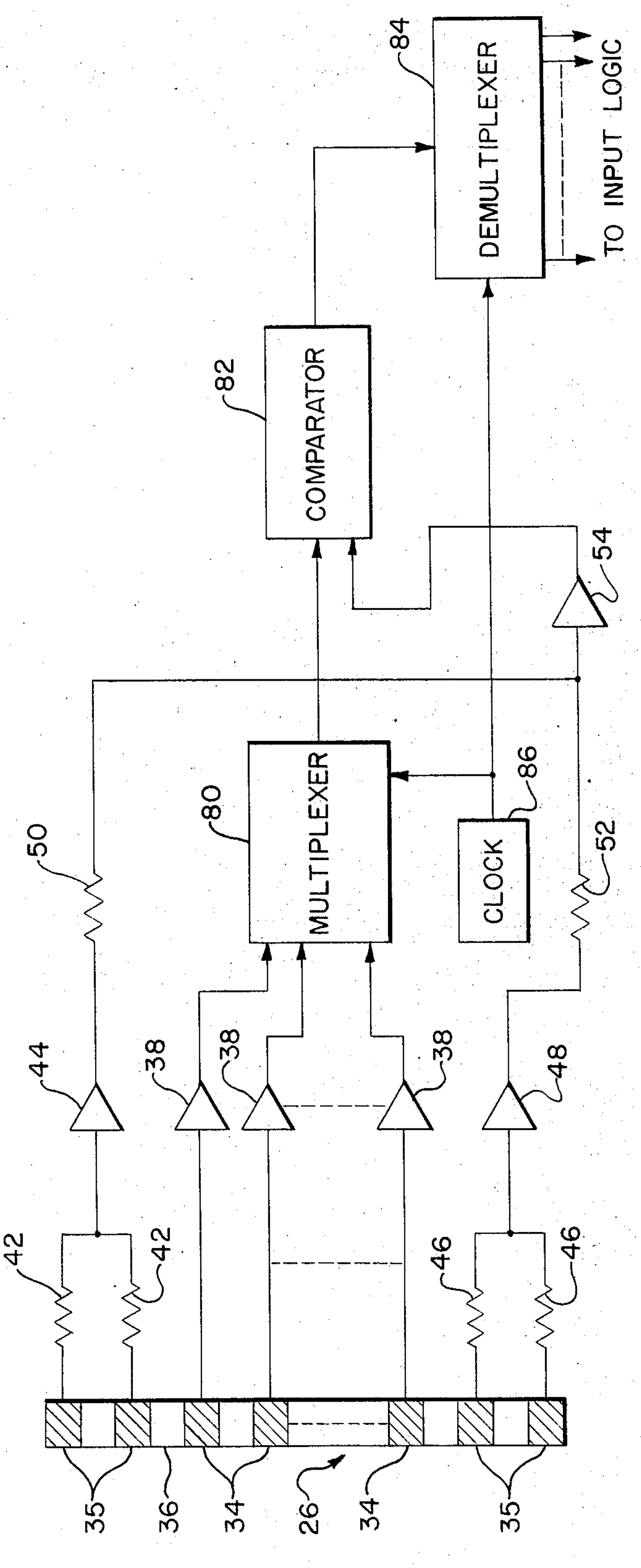
FIG. 6 is a schematic representation of an alternative embodiment of the invention.

In the embodiment of the invention described hereinabove the photosensor array 26 provides, simultaneously parallel output signals which are processed by parallel channels to derive character data. In an alternative embodiment, the invention also contemplates the scanning of the array photosensors in a time sequential manner and the multiplexing of scanned signals through common processing circuitry. This latter embodiment is illsutrated in FIG. 6. The amplifiers 38 associated with character-viewing photosensors 34 and the reference signal circuitry associated with background-viewing sensors 35 are the same as described in connection with FIG. 3. The output signals from amplifiers 38 are applied to the input of a multiplexer 80, the output of which is coupled to one input of a comparator 82. The comparator also receives a reference signal from amplifier 54 as described in connection with FIG. 3. The output of comparator 82 is coupled to a demultiplexer 84 the plurality of outputs thereof being applied to the input logic. A clock 86 controls operation of multiplexer 80 and demultiplexer 84.

Under the government of clock 86 multiplexer 80 is caused to sequentially scan the signals from amplifiers 38 and to sequentially apply these signals to comparator 82. The comparator is operative to compare the input signals with its thereshold level derived from the reference signal from amplifier 54 to provide an output signal representing the black or white level of each of the input signals from amplifier 38. The black-white decision signals are demultiplexed by operation of demultiplexer 84, also operative under the control of the clock 86 to provide a plurality of digital output signals of a number corresponding to the signals from amplifier 38 for application to input logic for character detection and subsequent recognition. The embodiment of FIG. 6 does not require parallel redundant channels, as in the embodiment of FIG. 3, but rather employs a single comparator on a time shared basis. As a further alternative, the signals from sensors 34 can be directly multiplexed and applied to a common amplifier rather than employing the plurality of amplifiers 38 illustrated. The reference signals from sensors 35 can also be multiplexed if desired and applied to sample and hold circuitry to produce a reference signal from which the adaptive comparator threshold level is derived. The photosensor array 26 can be physically skewed with respect to axis 13 (FIG. 1), with the timing of the scanning by multiplexer 80 of signals from amplifiers 38 selected to effectively provide scanning along axis 13.

From the foregoing it should be evident that an optical character detection system is provided in which digital signals are generated to reliably represent character data being sensed in an adaptive manner in accordance with actual reflectance characteristics of a document surface being scanned. It will be appreciated that various alternative implementations and modifications of the invention can be made without departing from the spirit and true scope of the invention. For example, the photosensor array need not be completely along a common linear axis as described in the above embodiment, but alternatively, the background sensors can be arranged in any convenient position to sense portions of the document surface to provide a measure of background reflectivity. In addition, the electronic circuitry can take a variety of forms to suit particular system specifications. Accordingly, it is not intended to limit the invention by what has been particularly shown and described, except as indicated in the appended claims.

What is claimed is:

1. In an optical character recognition system having document surface adapted for relative movement with respect to an elongated array of photosensors and having characters formed along a first area of said surface and at least one second area of said surface which contains no character information, means for illuminating said first and second areas of said document surface, and means for imaging a portion of said first and second areas onto said array, a system for the detection of characters on said document surface comprising:

an elongated array of photosensors each of like response disposed along an axis angularly disposed with respect to the axis of relative movement and arranged to receive light reflected from said first area of said document surface and operative to provide a plurality of first signals representative of the reflectance of said first area and characters contained thereon;

at least one photosensor of like response as said array of photosensors and arranged to receive light reflected from said at least one second area of said document surface and operative to provide at least one second signal representative of the reflectance of said at least one second area;

means for amplifying each of said plurality of first signals;

means for processing said at least one second signal to provide a reference signal; and a plurality of comparators each receiving said reference signal and a respective one of said amplified first signals and having a threshold level derived from said reference signal, each operative to produce a digital output signal of one logic level representing character data when the magnitude of said first signal is less than or equal to that of said threshold level, and to produce a digital output signal of another logic level representing the absence of character data when the magnitude of said first signal is greater than that of said threshold level, said means for processing said at least one second signal includes means operative in the absence of said document surface from said illuminating means to clamp said threshold level to a level greater than that of said first signals to cause said comparators to each produce a digital output signal of said one logic level.

2. The invention according to claim 1 wherein said at least one photosensor is part of said elongated array of photosensors and is disposed on at least one end thereof.

3. The invention according to claim 1 wherein said at least one photosensor includes a plurality of photosensors of like response as said array of photosensors and arranged to receive light from said at least one second area of said document surface and each operative to provide a second signal representative of the reflectance of said at least one second area; and wherein said processing means includes means for combining said second signals to provide said reference signal which is representative of the average reflectance of said at least one second area.

4. The invention according to claim 2 wherein said array of photosensors is formed on a common semiconductor substrate, each photosensor being spaced from adjacent ones thereof by a predetermined amount.

5. The invention according to claim 1 wherein said elongated array of photosensors is disposed along an axis substantially orthogonal to said axis of relative movement.

6. The invention according to claim 1 including:

means for multiplexing said plurality of first signals in a time sequential manner to provide a time sequential signal for application to said plurality of comparators; and means for demultiplexing said digital output signal to produce a plurality of said digital output signals associated with said array of photosensors.

* * * * *